United States Patent [19]
Giani et al.

[11] 3,742,190
[45] June 26, 1973

[54] APPARATUS FOR LABORATORY TESTING OF SUSTAINED RELEASE DRUGS

[75] Inventors: Celestino Giani; Roberto Valducci, both of Province Milan, Italy

[73] Assignee: Eurand S.p.A., Balsamo, Milan, Italy

[22] Filed: July 21, 1971

[21] Appl. No.: 164,618

[30] Foreign Application Priority Data
July 22, 1970   Italy .............................. 27733 A/70

[52] U.S. Cl. ................ 219/389, 23/253 R, 23/259, 219/209, 219/388, 219/400, 219/413, 219/441, 219/521
[51] Int. Cl. ......................... F27b 7/00, F27d 11/02
[58] Field of Search .................... 219/209, 210, 388, 219/389, 400, 413, 430, 435, 439, 441–442, 521, 523; 23/259, 253 R

[56] References Cited
UNITED STATES PATENTS

| | | | |
|---|---|---|---|
| 3,112,387 | 11/1963 | Bisordi et al. ................ | 219/521 X |
| 3,214,566 | 10/1965 | Wilson ........................... | 219/400 |
| 1,831,151 | 11/1931 | Walker .......................... | 219/210 |
| 1,865,472 | 7/1932 | Lamstein ...................... | 219/439 X |
| 1,884,585 | 10/1932 | Crossley ........................ | 219/210 |
| 1,884,797 | 10/1932 | Meyer ........................... | 219/210 X |
| 2,104,563 | 1/1938 | Kurlbaum ..................... | 219/210 |
| 2,972,038 | 2/1961 | Gomersall ..................... | 219/441 |
| 3,098,721 | 7/1963 | Jewell ............................ | 23/259 |
| 3,607,099 | 9/1971 | Scordato et al. .............. | 23/259 |
| 3,626,156 | 12/1971 | Tahizawa et al. ............. | 219/388 X |

*Primary Examiner*—Volodymyr Y. Mayewsky
*Attorney*—Gordon W. Hueschen

[57] ABSTRACT

An apparatus for lab testing sustained release drugs, characterized by the fact of consisting of a thermostatic chamber accurately regulated to a temperature falling within a very restricted range, said temperature being controlled by a mercury bulb thermometer with maximum and minimum contact points and a relay acting across a switch connected to a heat source, whose thermostatic chamber holds a rotating wheel-shaped device upon which is fixed a given number of elution bottle housings.

3 Claims, 4 Drawing Figures

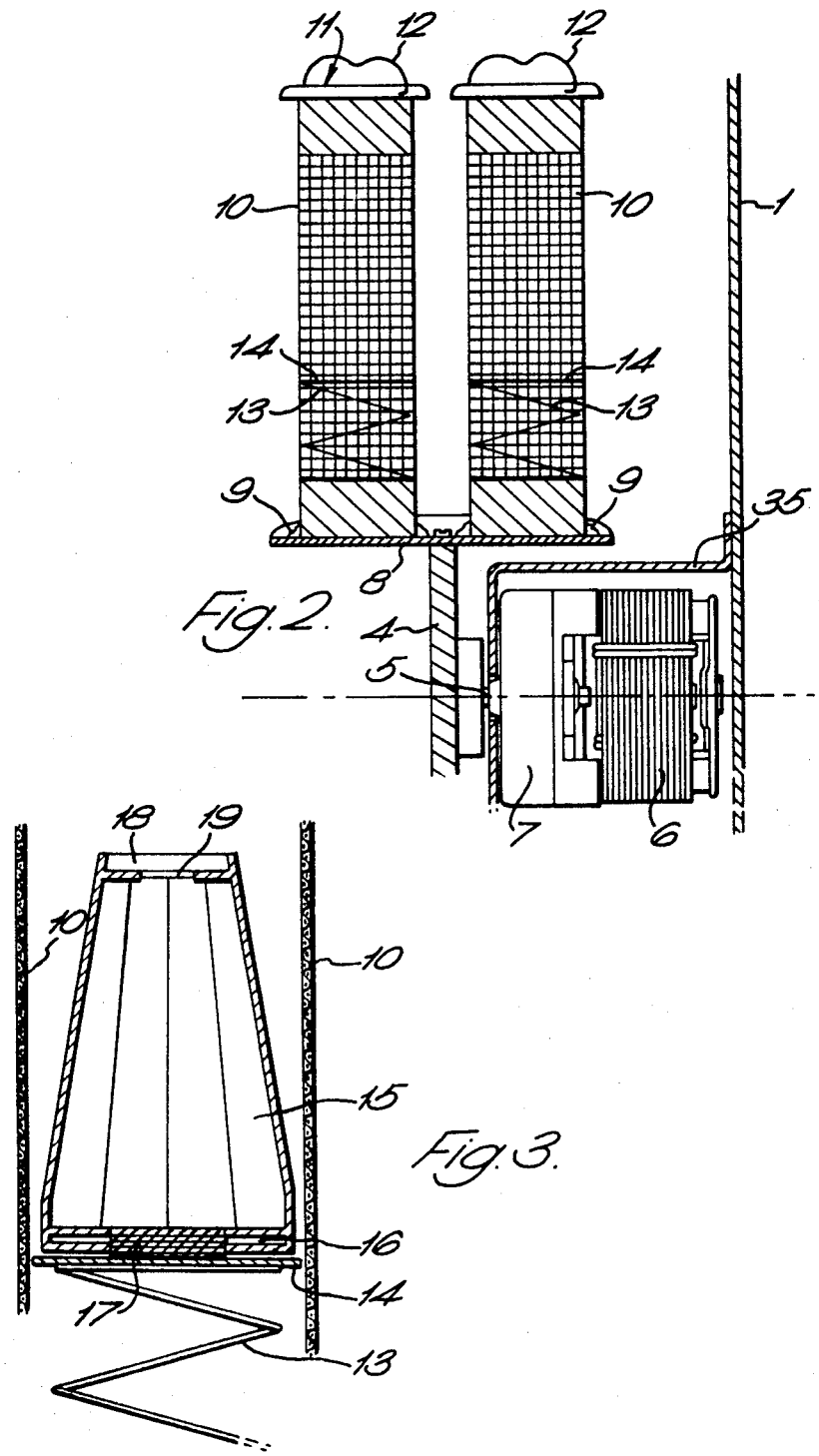

APPARATUS FOR LABORATORY TESTING OF SUSTAINED RELEASE DRUGS

The present invention relates to an apparatus for lab testing sustained release drugs. Said apparatus allows uniting sufficient execution simplicity with reasonably true physiological duplication.

Though there has been an ever-increasing interest in the sector of sustained release drugs, the sector's present lab testing equipment and methods are non-uniform and often give negative results executionwise in respect to continuous production control. This fact is mainly true because until now no equipment has been developed able to simulate specific conditions to which sustained release drugs are exposed in the gastrointestinal tract. Thus to accomplish proper simulation, adaptive use was usually made of apparatus designed and normally utilized to analyze the behavior of completely different product types, the same apparatus obviously not offering for sustained release drugs testing the absolute precision the pharmaceutical field demands.

For once a lab test offers sure data, it is of the greatest importance to be able to guarantee this data's reproducibility within the environment of the prepared product's original and successive lots.

Even if true physiological duplication is the aim, it may be impossible to perfectly reproduce the human organism's physiological conditions. Nevertheless, the pharmaceutical end-product's overall uniformity must be assured.

Sustained release drug pellets are exposed to a given number of rigorously-reproducible, easy-to-measure conditions and mechanical, chemico-environmental changes, through the basic use of solutions of gastrointestinal juices simulated at diverse pH measures. The pellets are immersed in the solutions contained in appropriate elution bottles, which are then hermetically sealed and placed in the lab test apparatus, relative to the present invention, and made to rotate for the time established for the relative phase corresponding to a given gastrointestinal environment pH.

The conditions to which a sustained release drugs lab testing apparatus must respond are: first, a rigorously constant rotating movement, to simulate gastrointestinal motility and, more important, to show that said movement does not provoke some unlooked for behavior in the release of the drugs; second, a likewise rigorously constant temperature; and third, absolutely sure regulation and control devices to guarantee perfect reproducibility of results. As mentioned earlier, no apparatus of this nature, especially designed and constructed to accomplish the above aims, has up until now been available.

SUMMARY OF THE INVENTION

The object, then, of the present invention is that of creating an apparatus especially studied, designed and constructed to give high-precision service for both sustained release drugs testing and for other lab testing, such as that regarding taste and odor masking, or other variable time characteristics, all pertinent to pellets, tablets, drops, powders and, particularly more-recent microencapsulated products.

The apparatus for lab testing sustained release drugs, according to the present invention, is characterized by the fact that said apparatus consists of a thermostatic chamber accurately regulated to a strict temperature range by means of a mercury bulb thermometer having minimum and maximum contact points and by means of a relay actuated across a switch controlling a heat source. Within the thermostatic chamber is a rotating wheel-shaped device carrying a given number of clamp housings for holding elution bottles, said device being set to turn on its axis at a strictly regulated, uniform speed.

The wheel-shaped device is best set in motion by a high-precision reduction motor which rotates the device at the fixed speed rate of 30 rpm, this rate assuring efficient, non-violent simulated stirring of the gastrointestinal juice solution for the preestablished time-length. The thermostatic chamber's strict temperature range corresponds to that found in the human body, i.e., $37° \pm 0.5°$ C.

BRIEF DESCRIPTION OF THE DRAWINGS

Further characteristics, advantages and constructive details, according to the present invention, are made clear by the particularized description which follows. Said description, given to exemplify and not to limit the apparatus itself, refers to the attached illustrative and schematic drawings, wherein:

FIG. 2 is a partial lateral view of the reduction motor, and of a clamp holding a pair of elution bottle housings;

FIG. 3 details an elution bottle housing which contains a magnetized space filler;

DETAILED DESCRIPTION OF THE PREFERRED EMBODIMENT

Figure 1:
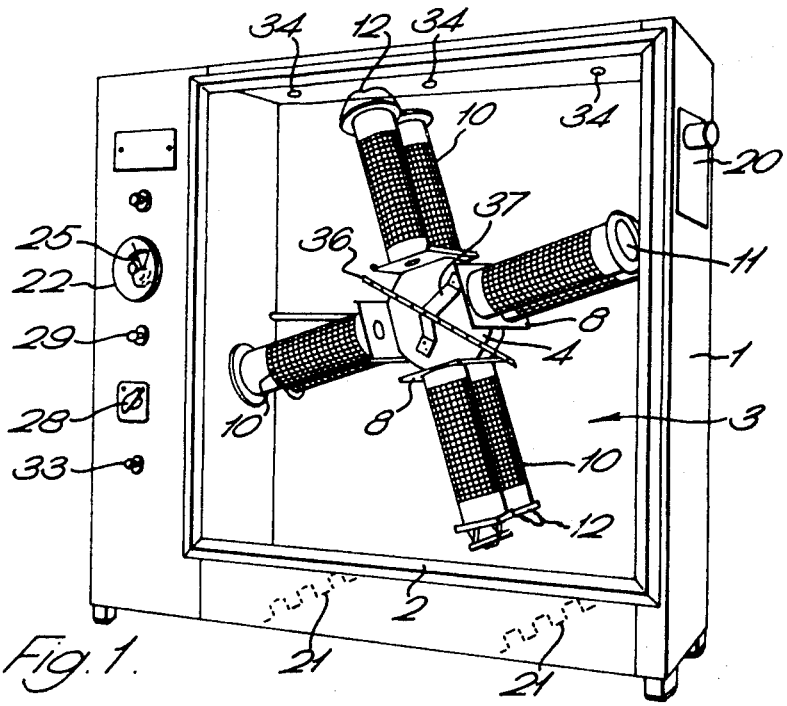
FIG. 1 is a general perspective view of the apparatus showing particularly the thermostatic chamber, its wheel-shaped device, the elution bottle housings, and the latter's clamps.

Referring still to the above drawings and especially, first of all, to FIGS. 1, 2, 3, note that the apparatus is made up of an external framework or paneling 1, equipped with a large, frontal, glass inspection window 2, allowing easy observation of the thermostatic chamber interior 3, which forms the major part of the apparatus.

Placed within the apparatus thermostatic chamber is a wheel-shaped device 4, set in motion by the utility axis 5 of a synchronous electric motor 6, coupled to a geared mechanical reducer 7, which permits high-precision rotation speed uniformity, a quality unattainable using less sophisticated systems as, for example, a flywheel clutch transmission.

The rotating wheel-shaped device 4 carries a given number (generally four) of support plates 8, each of which in turn carries at least one, but more usually two attachments 9, side-by-side, for the elution bottle housings 10. At the free end of said housings 10, there are openings 11 for inserting in the housings 10 their respective elution bottles, the openings 11 each being sealable by a snap-on cover 12, which holds each elution bottle in place within its relative housing 10. Also helping to hold each elution bottle firm within its housing 10 is a push-up compressible spring 13, fixed to the bottom of the housing and equipped on top with a flat plate 14, against which rests the base of an elution bottle whenever the latter is introduced into the housing 10.

Some elution bottles, however, are of a length shorter than that of the elution bottle housing. To adapt such short bottles to proper housing length, a filler device, illustrated in FIG. 3, is used. Said filler device consists of a hollow cone 15, into whose base 16 is incorporated a permanent or an artificial magnet 17, which holds the cone 15 firmly against the plate 14 of the spring 13. The top of the cone 15 is cut off to offer a seat 18 for the bottom of the short elution bottle, the resultant hole 19 in the cut-off cone's top allowing the cone 15 to be extracted from the housing 10 with one finger, when the operator deems it again expedient to reinsert normal-length elution bottles.

In the above manner, the elution bottle is thus always pushed both towards the housing opening 11 and the housing snap-on cover 12, thereby engaging the latter's stopper which then firmly seals the elution bottle. The systemizing, moreover, of the spring 13 at the opposite or bottom end of the housing 10 leaves the housing opening 11 completely free for the introduction of bottles having complex forms, taps or faucets which otherwise could become entangled in the coils of traction springs fixed on instead and pushing out from the housing side to envelop therefrom an inserted elution bottle's lateral surface area.

Note that the thermostatic chamber 3 has a side opening 20 for extracting elution bottles or large test tubes.

Electrical resistances (coils) 21 are placed at the bottom of the thermostatic chamber 3 and bring the latter to the desired temperature. As a heat source, electrical resistances are preferable to other means, and in particular to electric lamps, which need greater aeration, wear out more rapidly, and can be more easily damaged. Electrical resistances, instead, are robust, last long, function surely and can withstand without negative effect any spillage on them from the elution bottles.

Though the electrical resistances 21 are found only at the one bottom side of the thermostatic chamber 3, the heat they produce enters into and is uniformly distributed throughout the chamber 3, because of the constant rotation of the wheel-shaped device 4 and its housings 10 which continuously stir and uniformly spread the heated air about the chamber 3. The hotter air, moreover, rises through convection to the top of the chamber 3, from where it exits through special little holes 34. The chamber temperature is not at all affected by the motor 6, which is screened within an appropriate casing 35. The motor 6, in addition, has more power than it needs and thus runs very smoothly. The chamber temperature can also be visibly checked by directly reading a thermometer 36, fixed on a special support 37, which in turn is mounted on the rotating wheel-shaped device 4.

Chamber thermostating, to repeat, must be realized with maximum precision. Thus not used are more economical but certainly less accurate systems utilizing, for example, thin bimetallic sheets, which do not lend themselves easily to minute settings, and which often lose a setting once one is made, thereby requiring for the latter, continuous checking. Used instead, then, is a system consisting of a quadrant thermometer 22 with maximum and minimum contact points 23, 24, plus an indicating needle 25 which functions through an expanding-contracting mercury load contained in a bulb 26, placed appropriately within the thermostatic chamber 3 and electrically connected to a relay 27, which commands the inserting or disinserting of the electrical resistances 21.

Figure 4:
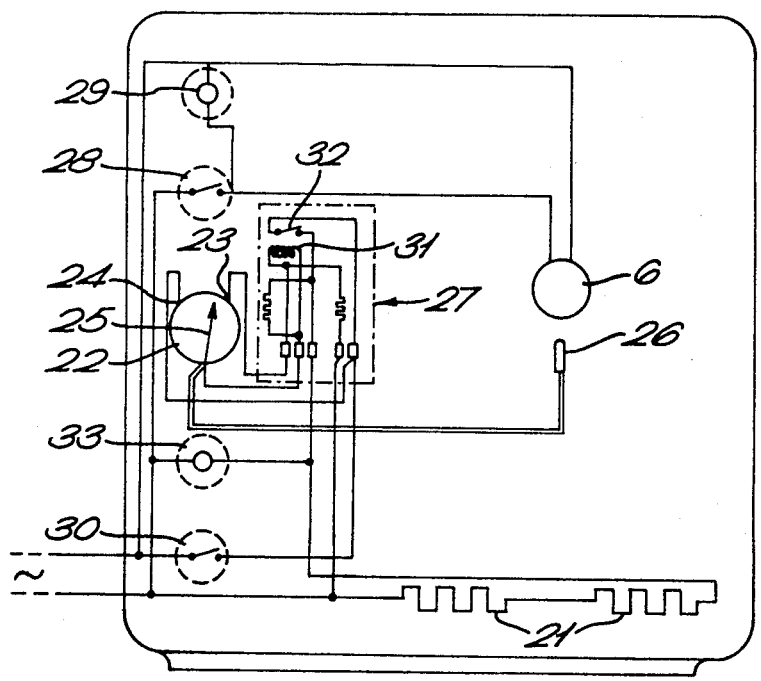
FIG. 4 details the regulation and control electrical devices and relative connecting circuits.

Reference is next made to FIG. 4 to explain better the functioning of the electric circuit of the test apparatus, according to the present invention, wherein normal A.C. network current goes from the feed line to the on-off switch 28 of the synchronous electric motor 6, causing the warning lamp 29 to visibly signal that the motor is running.

The current also goes across another switch 30 to the electrical resistances 21, which then begin to reheat the test chamber 3.

An alternate method uses just one switch to command simultaneously the starting of the motor and the resultant heating of the chamber.

Dilated by the temperature increase, the mercury in the bulb 26 transmits the thermo measure to the indicating needle 25. When the needle 25 finds itself running in the arc between the maximum and minimum contact points to finally reach the minimum contact point 24, the relay is excited, its coil 31 attracts the contact 32, and the current passes to be utilized by the electrical resistances 21, causing the simultaneous lighting of the warning lamp 33. When, on the other hand, the needle reaches the maximum contact point 23, the current runs through the shorter line to invert the relay coil's 31 polarity, which opens the contact 32 to shut off current going to the electrical resistances 21. Thus the relay becomes disactuated and so remains until the needle reaches once more the minimum contact point 24, whereupon the relay again becomes actuated and so remains until the needle again swings back to the maximum contact point, and so the process repeats itself throughout the entire test operation.

We claim:

1. Apparatus for laboratory testing of sustained release drugs which comprises
   a heating cabinet made up of a plurality of connected panelings and a window, together defining a heating chamber;
   rotatable mounting means in said treating chamber on one of said panelings for elution bottle holding elements;
   at least one elution bottle holding element attached to said mounting means;
   an electrical resistance heater means situated within said heating chamber and electrically insulated therefrom;
   an electrical circuit operably connected to said electrical resistance heater means and adapted to energize said electrical resistance heater means in response to a first input signal and to deenergize said electrical resistance heater in response to a second input signal; and
   a mercury bulb thermometer having a maximum contact point and a minimum contact point mounted within said heating chamber, operably connected into said electrical circuit, and generating said first input signal when temperature within said heating chamber is below a first predetermined value and generating said second input signal when temperature within said heating chamber reaches a second predetermined value.

2. Apparatus for laboratory testing of sustained release drugs which comprises a heating cabinet made up of a plurality of connected panelings and a window, together defining a heating chamber;

rotatable mounting means in said treating chamber on one of said panelings for elution bottle holding elements;

at least one elution bottle holding element attached to said mounting means and comprising a plate affixed to said mounting means, a frame housing attached at one end to said affixed plate and having an opening at the outer end thereof for receiving an elution bottle, snap-on cover means for sealing said opening, a compression spring within said frame housing and attached at one end thereof to said affixed plate, and a top plate within said frame housing and attached to the free end of said compression spring for abutting the bottom of an elution bottle inserted in said frame housing and urging said inserted elution bottle against said snap-cover means;

an electrical resistance heater means situated within said heating chamber and electrically insulated therefrom;

an electrical circuit operably connected to said electrical resistance heater means and adapted to energize said electrical resistance heater means in response to a first input signal and to deenergize said electrical resistance heater in response to a second input signal; and a mercurby bulb thermometer having a maximum contact point and a minimum contact point mounted within said heating chamber, operably connected into said electrical circuit, and generating said first input signal when temperature within said heating chamber is below a first predetermined value and generating said second input signal when temperature within said heating chamber reaches a second predetermined value.

3. The apparatus for laboratory testing of sustained release drugs in accordance with claim 2 wherein a hollow spacer is provided on said top plate for accomodating a relatively short elution bottle within said frame housing; said spacer having a frusto-comical configuration, having a magnet attached to the base of said spacer for holding said spacer on said top plate, and being provided at the upper end of said spacer with a seat means for the bottom of said relatively short elution bottle.

* * * * *